(12) United States Patent
Rao et al.

(10) Patent No.: US 10,686,817 B2
(45) Date of Patent: Jun. 16, 2020

(54) IDENTIFICATION OF A DNS PACKET AS MALICIOUS BASED ON A VALUE

(71) Applicant: HEWLETT PACKARD ENTERPRISE DEVELOPMENT LP, Houston, TX (US)

(72) Inventors: Prasad V. Rao, Princeton, NJ (US); Sandeep N. Bhatt, Princeton, NJ (US); William G. Horne, Princeton, NJ (US); Pratyusa K. Manadhata, Princeton, NJ (US); Miranda Jane Felicity Mowbray, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 235 days.

(21) Appl. No.: 15/754,282

(22) PCT Filed: Sep. 21, 2015

(86) PCT No.: PCT/US2015/051119
§ 371 (c)(1),
(2) Date: Feb. 21, 2018

(87) PCT Pub. No.: WO2017/052490
PCT Pub. Date: Mar. 30, 2017

(65) Prior Publication Data
US 2018/0255083 A1 Sep. 6, 2018

(51) Int. Cl.
*H04L 29/06* (2006.01)
*H04L 29/12* (2006.01)
(52) U.S. Cl.
CPC ...... *H04L 63/1425* (2013.01); *H04L 61/1511* (2013.01); *H04L 61/3015* (2013.01); *H04L 63/0236* (2013.01); *H04L 63/1416* (2013.01); *H04L 63/1441* (2013.01)

(58) Field of Classification Search
CPC combination set(s) only.
See application file for complete search history.

(56) References Cited

U.S. PATENT DOCUMENTS

| 7,366,761 | B2 | 4/2008 | Murray et al. |
| 8,521,667 | B2 | 8/2013 | Zhu et al. |
| 8,631,489 | B2 | 1/2014 | Antonakakis et al. |
| 2011/0302656 | A1* | 12/2011 | El-Moussa .......... H04L 63/1425 726/24 |

(Continued)

FOREIGN PATENT DOCUMENTS

CN 101558398 A 10/2009

OTHER PUBLICATIONS

Bill Home, "Collecting, Analyzing and Responding to Enterprise Scale DNS Events", found at https://www.first.org/resources/papers/conf2015/first_2015_-_horne-_bill_-_enterprise_scale_dns_events_20150526_fw.pdf, Oct. 2015.*
Bilge et al., "Exposure: Finding Malicious Domains Using Passive DNS Analysis", Proc. 28th Annu. Comput. Secur. Appl. Conf. (ACSAC'12), pp. 129-138, Oct. 2012.*
Rodney Topor, "Safety and Domain Independence", In: Liu L., Özsu M.T. (eds) Encyclopedia of Database Systems. Springer, 2009.*

(Continued)

*Primary Examiner* — Piotr Poltorak
(74) *Attorney, Agent, or Firm* — Hewlett Pacarkd Enterprise Patent Department

(57) ABSTRACT

Examples determine a number of hosts, within an enterprise, which are resolving a particular domain. Based on the number of hosts within the enterprise resolving the particular domain, the examples identify whether the particular domain is benign.

16 Claims, 7 Drawing Sheets

(56) References Cited

U.S. PATENT DOCUMENTS

| | | | |
|---|---|---|---|
| 2012/0005755 A1 | 1/2012 | Kitazawa et al. | |
| 2012/0042381 A1 | 2/2012 | Antonakakis et al. | |
| 2012/0233311 A1 | 9/2012 | Parker et al. | |
| 2013/0117282 A1 | 5/2013 | Mugali, Jr. et al. | |
| 2014/0215628 A1* | 7/2014 | Yan | H04L 61/1511 |
| | | | 726/25 |
| 2015/0111534 A1 | 4/2015 | Grayson | |
| 2015/0373039 A1* | 12/2015 | Wang | H04L 63/1425 |
| | | | 726/23 |
| 2015/0373043 A1* | 12/2015 | Wang | G06F 21/6254 |
| | | | 706/12 |
| 2016/0142432 A1* | 5/2016 | Manadhata | H04L 63/101 |
| | | | 726/25 |
| 2019/0058718 A1* | 2/2019 | Pangeni | H04L 61/1511 |

OTHER PUBLICATIONS

Alexa Internet, Inc., "Alexa—Actionable Analytics for the Web," 2015, pp, 1-7 [online], Retrieved from the Internet on Sep. 22, 2015 at URL: <alexa.com>.

Bill Horne, "Collecting, Analyzing and Responding to Enterprise Scale DNS Events," Jun. 15, 2015, pp. 1-34, Hewlett-Packard Development Company, L.P.

Fabio Soldo et al., "Optimal Source-Based Filtering of Malicious Traffic," Jun. 7, 2010, pp. 1-14.

Graham Cormode et al., "Finding Hierarchical Heavy Hitters in Data Streams," 2007, pp. 1-43, ACM.

International Search Report and Written Opinion, International Application No. PCT/US2015/051119, dated Jul. 29, 2016, pp. 1-10, KIPO.

\* cited by examiner

IDENTIFICATION OF A DNS PACKET AS MALICIOUS BASED ON A VALUE

BACKGROUND

A Domain Name System (DNS) enables applications to find resources on the Internet based on user-friendly names (e.g., domain names) rather than a dot-decimal notation. In the DNS system, a client may use a domain name to request an Internet Protocol (IP) address.

BRIEF DESCRIPTION OF THE DRAWINGS

In the accompanying drawings, like numerals refer to like components or blocks. The following detailed description references the drawings, wherein.

DETAILED DESCRIPTION

Enterprises may query many domains in a given day; however some domains may be queried more frequently than others. The DNS queries and domains may be logged and retain for analysis which takes up much space. As such, a smaller number of these domains account for a larger fraction of resources, such as the storage space, events, and alerts. The dedication of resources to this smaller number of domains may slow down analytics and incur storage costs.

To address these issues, examples disclosed herein filter out domains that are likely benign so resources may be focused on other domains which may be malicious. The examples identify whether a particular or specific domain is benign based on a number of hosts resolving the particular domain and a number of resolutions corresponding to the particular domain.

In another example based on the identification of the particular domain as benign, the particular domain may be incorporated into a whitelist and DNS log information discarded. In this example, the system may use a whitelisting approach to ignore the DNS requests which are benign. Incorporating the particular domain into the whitelist dynamically generates enterprise-specific whitelists in real-time. Additionally, discarding the DNS log informations results in storage and resource savings.

Figure 1:
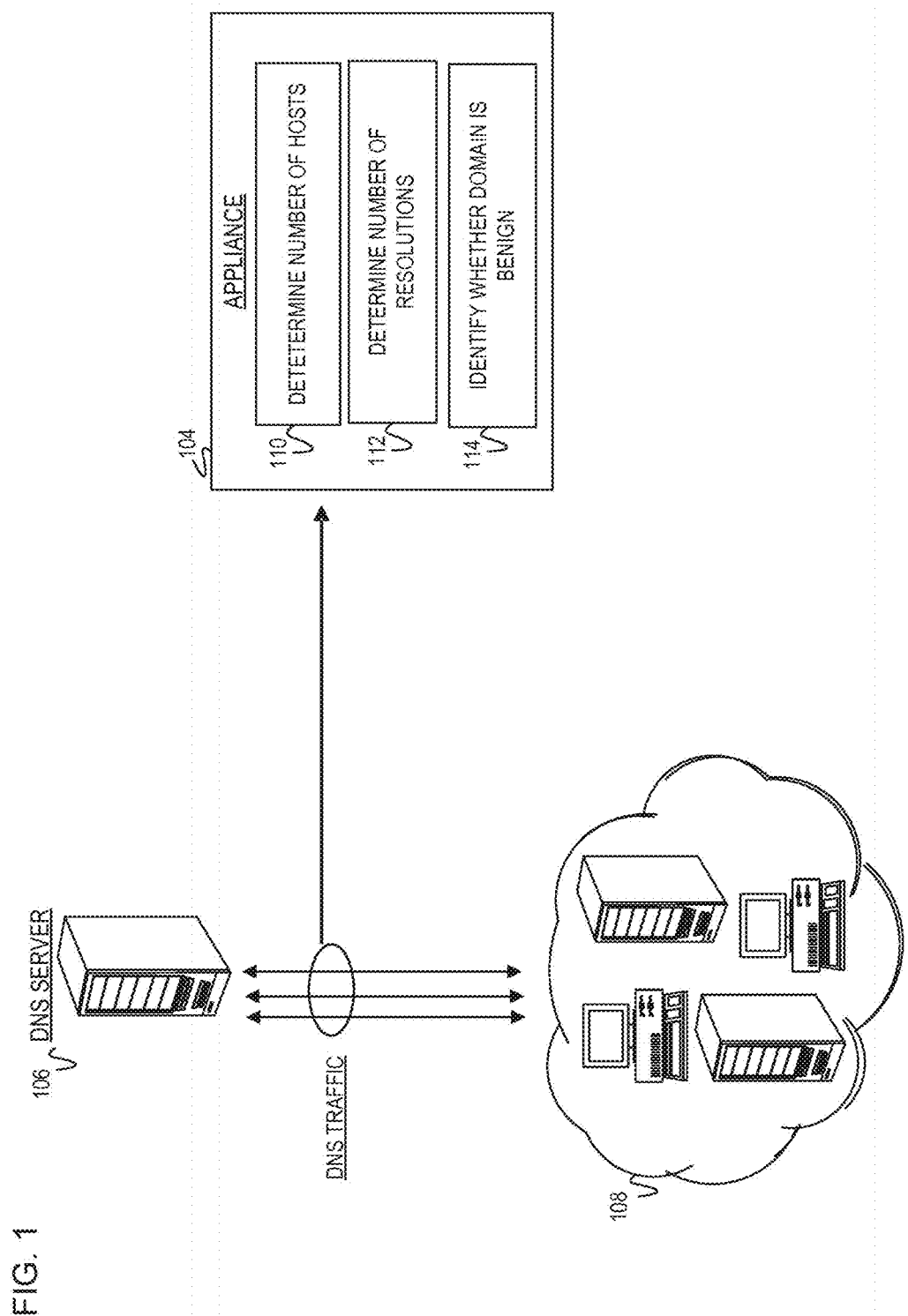
FIG. 1 is a block diagram of an example system including an appliance identify whether a particular domain is benign based on a number of hosts resolving the particular domain and a number of resolutions corresponding to the particular domain.

Referring now to the figures, FIG. 1 is a block diagram of an example system including a DNS server 106 and hosts 108 within an enterprise to exchange DNS traffic. The system includes an appliance 104 to capture a copy of the DNS traffic. The appliance 104 may proceed to determine a number of hosts resolving a particular domain at module 110 and a number of resolutions corresponding to the particular domain at module 112. The appliance 104 uses both of these numbers to identify whether the particular domain is benign at module 114. The hosts 108 may query many domains across a network; however, the hosts 108 within the enterprise may resolve the same domains over again. The domains are names which are used in various networking contexts and addressing purposes. As such, each domain represents an IP resource, such as personal computer used to access the Internet, another server hosting a website, or the website itself. The particular domain is considered to be one of these specific domains. Accordingly, the system in FIG. 1 represents a networking system to receive and transmit DNS traffic. As such, implementations of the system include a domain name system (DNS) networking, wide area network, legacy network, local area network (LAN), Ethernet, optic cable network, software defined network (SDN), or other type of networking system capable of handling DNS traffic. Although FIG. 1 illustrates the system with components 104, 106, and 108 implementations should not be limited as the system may include additional components such as an additional DNS server, etc.

The DNS server 106 is a domain name system (DNS) server which implements a network service for providing an IP address in response to a domain query from the hosts 108. As such, the hosts 108 and the DNS server 106 exchanges communications in the form of the DNS traffic. For example, the DNS server 106 may receive DNS queries from the hosts 108 to translate domains into the corresponding IP address(es). In response the DNS server 106 returns the IP address back to the requesting host 108. As such, implementations of the DNS server 106 include a Local Area Network (LAN) server, web server, cloud server, network server, file server, or other type of computing device capable of receiving domain name requests and returning an IP address(es) in response.

The hosts 108 are the networking components within the enterprise that may each exchange DNS traffic with the DNS server 106. Specifically, the hosts 108 provide DNS requests to the DNS server 106 and in return receive DNS responses with the corresponding IP addresses. The hosts 108 within the enterprise, may transmit requests for many domains in the network; however, the hosts 108 may resolve some domains more than other domains. As such, these domains which are resolved more frequently and may be tracked by the appliance 104 to identify the particular or specific domain among the more frequently resolved domains within the enterprise that are benign. The enterprise is considered an entity, such as a business or company, which has a limited number of networking device(s) (e.g., hosts 108). Those networking device(s) transmitting DNS requests to the DNS server 106 are referred to as hosts 108. These DNS requests may be tracked by the appliance 104 to determine the number of hosts which may be resolving among the frequently resolved domains. Although FIG. 1 illustrates a server and a computer, implementations should not be limited as the hosts 108 may further include a router, server, mobile device, computing device, networking switch, virtual networking component or other type of networking component cable of exchanging DNS traffic with the DNS server 106.

The appliance 104 is considered a networking device which functions to identify whether the particular domain is benign. The appliance 104 may capture a copy of the DNS traffic between the hosts 108 and the DNS server 106. Capturing the copy of the DNS traffic, allows the appliance 104 to operate in the background of the DNS server 106 functionality. As such, the appliance 104 analyzes the DNS packets (e.g., DNS headers and the DNS requests) to the DNS server 106 to determine the number of hosts and the number of resolutions at modules 110-112. The appliance 104 uses the DNS header portion and the DNS request portion to track which hosts 108 are resolving which domains. In this implementation, the DNS header includes information such as the specific host which is transmitting the DNS request and which particular or specific domain may be resolved by the DNS server 106. Thus, the appliance 104 uses the DNS request to track the aggregate number of resolutions that correspond to the particular domain over the period of time. Determining the number of hosts and the number of resolutions at modules 110-112 the appliance 104 may proceed to identify whether the particular domain is benign at module 114. Implementations of the appliance 104 include, by way of example, a router, server, a networking switch, a computing device, a virtual networking component, or other type of networking component capable of identifying whether the particular domain is benign.

At modules 110-114, the appliance 104 identifies whether the particular domain is benign based on both the number of hosts and the number of resolutions. The number of hosts is considered the number of networking components within the enterprise that is resolving the particular domain among the list of frequently access domains. Using the determined numbers at modules 110-112, the appliance 104 may proceed to identify whether the particular domain is benign at module 114. In other implementations, if the determined numbers are both above thresholds, the particular domain is considered benign. If either of the numbers are below the thresholds, the particular domain is considered not benign (e.g., malicious). The thresholds may be illustrated in the following figures. The modules 110-114 may include, by way of example, instructions (e.g., stored on a machine-readable medium) that, when executed (e.g., by the appliance 104), implement the functionality of modules 110-114. Alternatively, or in addition, the modules 110-114 may include electronic circuitry (i.e., hardware) that implements the functionality of modules 110-114.

Figure 2:
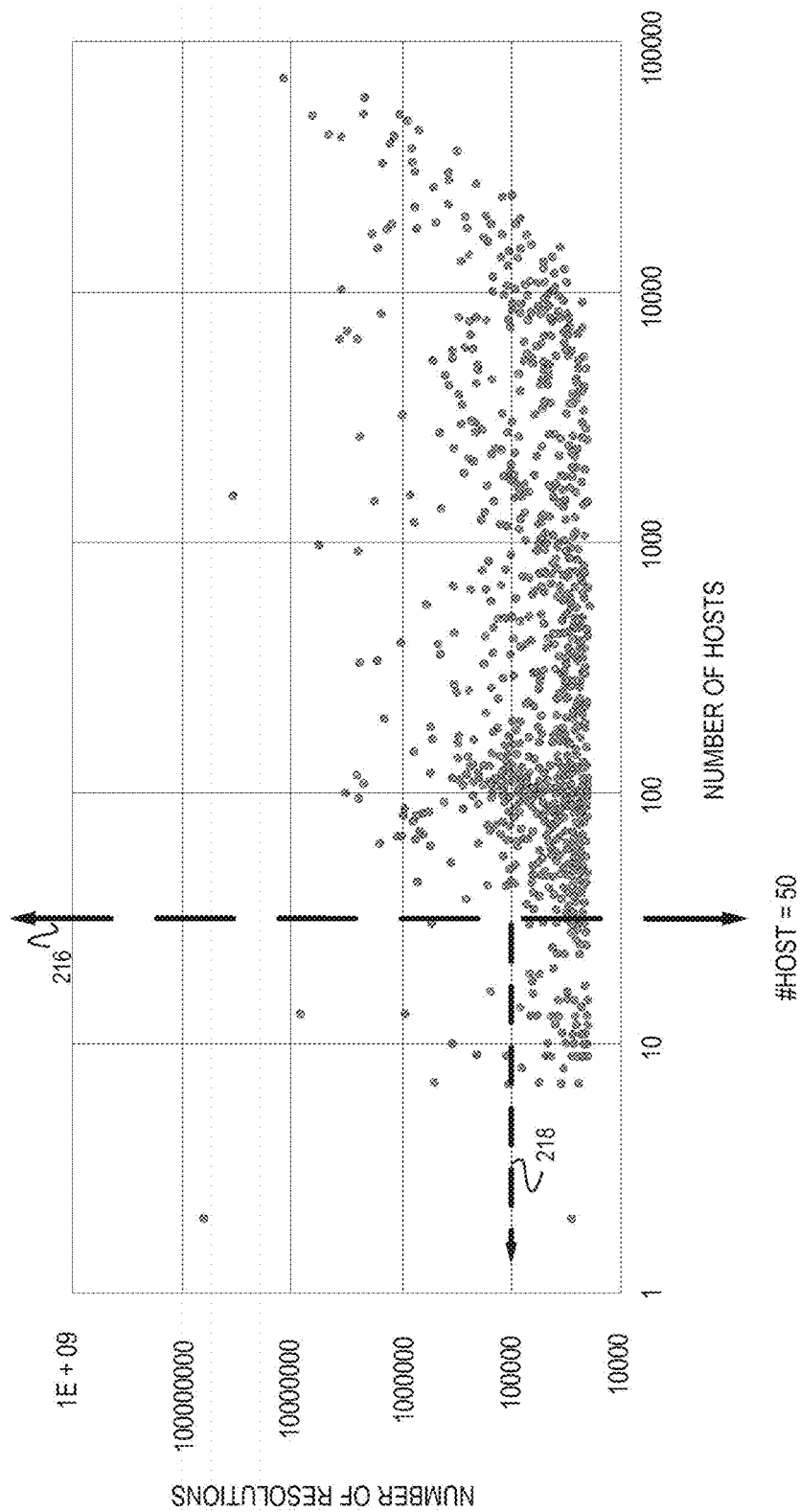
FIG. 2 illustrates an example diagram representing various domains based on a threshold corresponding to number of hosts resolving the various domains and another threshold corresponding to a number of resolutions directed to the various domains.

FIG. 2 illustrates a distribution graph of the most frequently resolved domains within an enterprise. Each dot on the distribution graph represents one of the most frequently resolved domains within the enterprise. As such, the most frequently resolved domains may be enterprise specific. The distribution graph provides a visual to identify the more popular domains in the enterprise. The distribution graph further includes an x-axis and a y-axis to plot each of the domains. The x-axis corresponds to the number of hosts within the enterprise resolving each domain. The y-axis corresponds to the number of resolutions for each domain. The x-axis includes a threshold 216 which relates to the number of hosts. This threshold 216 is condition which specifies when a given domain may be more likely to be considered benign. For example in FIG. 2, the threshold 216 condition includes identifying those domains that which may have been resolved by more than 50 hosts. In this example, the dots on the right hand of the threshold 216 would be more likely considered benign. In an implementation, in addition to the number of hosts to identify whether the particular domain is benign, the number of resolutions is also considered. In this implementation, the y-axis includes another threshold 218 which relates to the number of resolutions. This other threshold 218 specifies a condition for the number of resolutions corresponding to the particular domain. For example in FIG. 2, the other threshold 218 includes covering those resolutions which are greater than 10 k. This would mean the dots on the upper half are considered more benign. Combining both the number of hosts and the number of hosts, for the particular domain to be identified as benign, each number must fall above each respective threshold 216 and 218. If either of these numbers (e.g., the number of hosts ore the number of resolutions) for the particular domain is below the respective threshold 216 and 218, the particular domain is identified as not benign (e.g., malicious). For example, assume the distribution graph is divided into four quadrants. The top left quadrant is the first quadrant, the bottom left quadrant is the second quadrant, the bottom right quadrant is the third quadrant, and the top right quadrant is the fourth quadrant. Those domains in the fourth quadrant (i.e., the top right quadrant) are identified as benign since the numbers are above the thresholds 216 and 218.

In a further implementation, upon identifying those domains which are most likely benign, an appliance may incorporate those domains into a whitelist and discard the DNS log information corresponding to those domains. The whitelist may be generated from those domains which are above both thresholds 216 and 218 or incorporated into a previous existing whitelist. The whitelist is a collection of domains that are considered safe or benign. By selecting those domains which cover both thresholds 216 and 218, the summary and aggregate information is stored while the DNS log information which includes details such as specific records are discarded. This saves space and resources in the DNS system.

Figure 3:
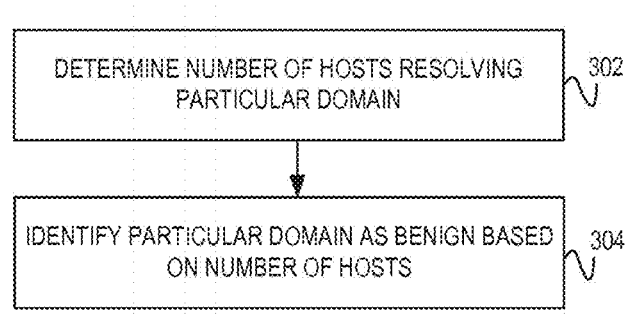
FIG. 3 is a flowchart of an example method executable by a computing to identify whether a particular domain is benign based on a number of hosts resolving the particular domain.

FIG. 3 illustrates a flowchart of an example method to identify whether a particular domain is benign based on a number of hosts resolving the particular domain within an enterprise. The method is executable by a computing device to determine the number of hosts resolving the particular domain within the enterprise. Upon determining the number of hosts within the enterprise, the computing device proceeds to identify whether the particular domain is benign. In discussing FIG. 3, references may be made to the components in FIGS. 1-2 to provide contextual examples. In one implementation, the appliance 104 executes operations 302-304 to identify whether a particular domain is benign. Although FIG. 3 is described as implemented by the appliance 104, it may be executable on other suitable components. For example, FIG. 3 may be implemented in the form of executable instructions on a machine-readable storage medium 604 and 704 as in FIGS. 6-7.

At operation 302, the computing device determines the number of hosts within the enterprise resolving the particular domain. Initially, the computing device may capture a copy of the DNS traffic between the hosts and the DNS server. Upon capturing the copy of the DNS traffic, the computing device may proceed to determine the number of hosts (within the enterprise) resolving the particular domain. The enterprise is an entity, such as a business or company in which employees work towards a common goal or purpose. As such, the enterprise has a limited number of computing device(s) working across a network. The computing device(s) may transmit DNS requests to a DNS server to resolve domains. These DNS requests may resolve multiple domain names of which the computing device may track a given domain based on how many of the hosts resolve the given domain. The computing device tracks the number of hosts resolving the given domain (i.e., particular domain) by processing a DNS header information within the DNS requests. The DNS header includes information such as the host or client that may be resolving the particular domain. Determining the number of hosts within the enterprise resolving the particular domain, the computing device proceeds to identify whether the particular domain is benign.

At operation 304, the computing device identifies whether the particular domain is benign. Using the determined number of hosts from operation 302, the computing device identifies whether the number is above a threshold. If the number of hosts resolving the particular domain is below the threshold, this may indicate the particular domain is malicious. Identifying whether the particular domain is benign based on the number of hosts, assume the more hosts resolving the given domain within the enterprise indicates the domain is benign. For example, the enterprise hosts (e.g., clients) query many domains, thus the particular domain is considered benign if many hosts resolve the particular domain. This indicates that particular domain is a popular domain within the enterprise. In response to the identification of the particular domain as benign, the computing device may proceed to drop the DNS traffic log corresponding to the particular domain and incorporate the particular domain into a whitelist with other known benign domains. In response to the identification of the particular domain as not benign (e.g., malicious), the particular domain name may be logged. During the logging process, the computing device may perform a domain generation algorithm on the domain and/or incorporate the particular domain into a blacklist with other known malicious domains. In one implementation, identifying whether the particular domain is benign is based on two different numbers. The first number being the number of hosts (within the enterprise) that is resolving the particular domain, the second number being a number of resolutions corresponding to the particular domain. This implementation is discussed in detail in the following figures.

Figure 4:
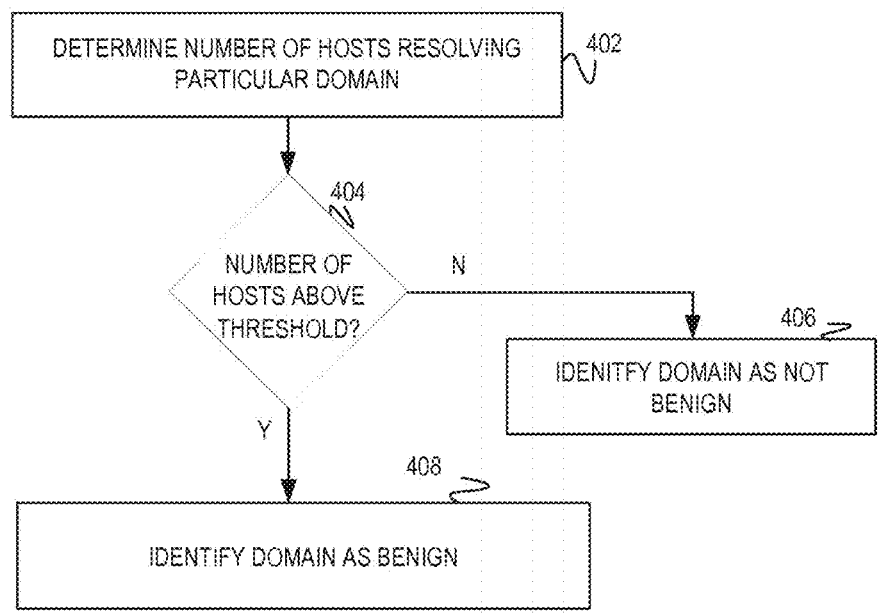
FIG. 4 is a flowchart of an example method executable by a computing device to identify if a particular domain is benign based on whether a number of hosts resolving the particular name is above a threshold.

FIG. 4 illustrates a flowchart of an example method to identify whether a particular domain is benign if a number of hosts resolving the particular domain is above a given threshold. The method is executable by a computing device to identify whether the particular domain is benign. The computing device determines the number of hosts, within an enterprise, resolving the particular domain. The computing device may obtain a value from the number of hosts and proceed to determine if the value is above the threshold. If the value is above the threshold, the computing device identifies the particular domain as benign. If the value is below the threshold, the computing device identifies the particular domain as not benign (e.g., malicious). In discussing FIG. 4, references may be made to the components in FIGS. 1-2 to provide contextual examples. In one implementation, the appliance 104 executes operations 402-408 to identify whether a particular domain is benign. Although FIG. 4 is described as implemented by the appliance 104, it may be executable on other suitable components. For example, FIG. 4 may be implemented in the form of executable instructions on a machine-readable storage medium 604 and 704 as in FIGS. 6-7.

At operation 402, the computing device determines the number of hosts within the enterprise that may be resolving the particular domain. Operation 402 may be similar in functionality to operation 302 as in FIG. 3.

At operation 404, the computing device determines if the number of hosts resolving the particular domain is above the threshold. The threshold may be pre-defined according to each enterprise. For example, one enterprise may choose to dedicate more resources to the DNS traffic and thus may choose to have a higher threshold to log more domains. Another enterprise may choose to dedicate fewer resources to the DNS traffic and may choose to have a much lower threshold. The threshold serves as a baseline to determine which domains are considered benign and which domains should be logged for further analysis. If the computing device determines the number of hosts is below the threshold, the computing device may proceeds to operation 406 identify the particular domain as not benign (e.g., malicious). If the computing device determines the number of hosts is above the threshold, the computing device may proceed to operation 408 to identify the domain as benign.

At operation 406, upon the determination the number of hosts is below the threshold, the computing device identifies the particular domain as not benign. The computing device may proceed to log the particular domain for analysis and/or incorporate particular domain on a blacklist.

At operation 408, upon the determination the number of hosts is above the threshold, the computing device identifies the particular domain as benign. In one implementation based on the identification of the particular domain as benign, the computing device may proceed to drop or discard the DNS traffic log associated with the particular domain. Dropping the DNS traffic log, the computing device focuses resources, such as storage, on those malicious domains which may be harmful. Operation 408 may be similar in functionality to operation 304 as in FIG. 3.

Figure 5:
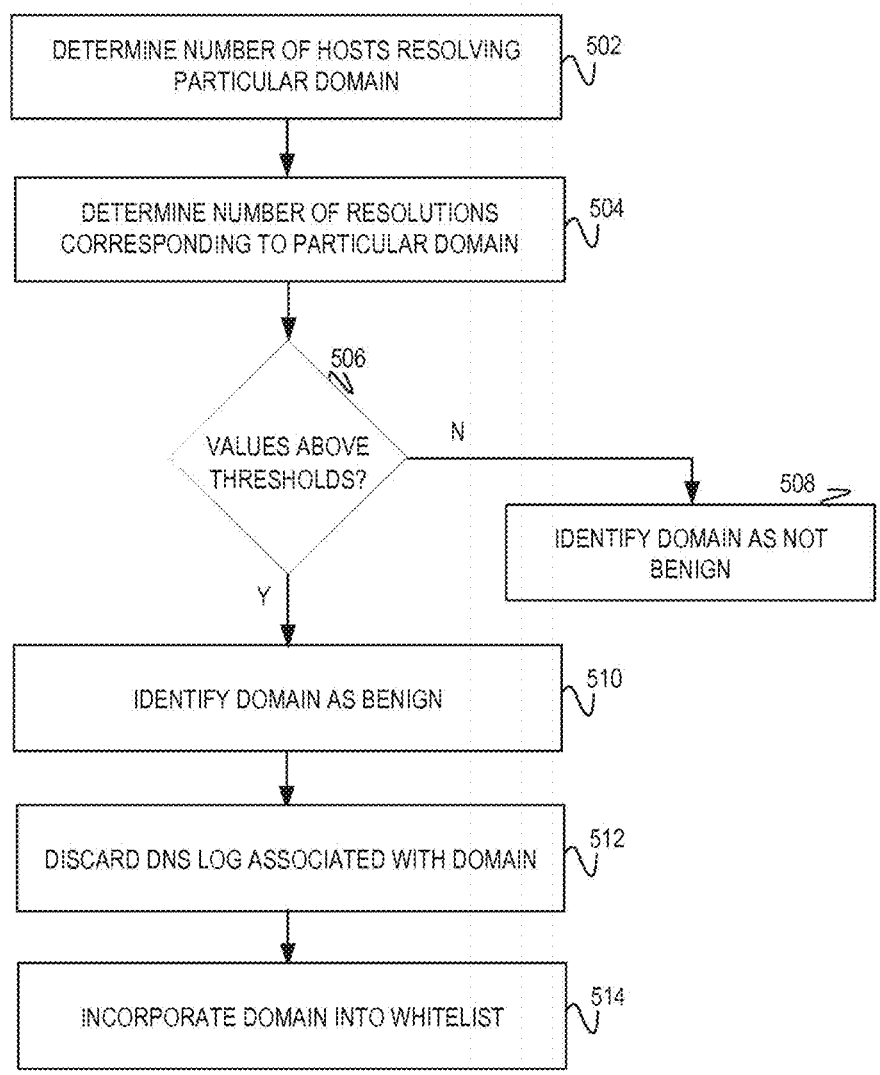
FIG. 5 is a flowchart of an example method executable by a computing device to identify whether a particular domain is benign if a number of hosts resolving the particular domain and a number of resolutions corresponding to the particular domain are above a threshold.

FIG. 5 illustrates a flowchart of an example method to identify whether a particular domain is benign based on both a number of hosts and a number of resolutions. The number of hosts are those clients in the enterprise which are resolving the particular domain. The number of hosts are those hosts in the enterprise which transmit a DNS query of the particular domain to the DNS server. In response, each host may receive the IP address for the requested particular domain. The number of resolutions corresponds to an aggregate number of DNS packets which resolve the particular domain over a period of time. The computing device tracks both of these number to determine if the numbers are each above a related threshold. Each of the thresholds serves as a condition to verify whether the particular domain is benign. For example, one of the thresholds is related to the number of hosts and the other threshold is related to the number of resolutions. These thresholds may intersect, thus creating a uniform threshold. In this implementation, the thresholds may form a four quadrant diagram. Thus, if both numbers (e.g., the number of hosts and the number of resolutions) are above this uniform threshold (falling within the fourth quadrant), the computing device may proceed to identify the domain as benign. If either of the numbers (e.g., the number of hosts or the number of resolutions) fall below the uniform threshold (falling within the first, second, or third quadrants), the computing device identifies the domain as not benign. If the computing device identifies the domain as benign, the computing device may proceed to discard a DNS log associated with the domain and/or incorporate the domain into a whitelist. In discussing FIG. 5, references may be made to the components in FIGS. 1-2 to provide contextual examples. In one implementation, the appliance 104 executes operations 502-514 to identify whether a particular domain is benign. Although FIG. 5 is described as implemented by the appliance 104, it may be executable on other suitable components. For example, FIG. 5 may be implemented in the form of executable instructions on a machine-readable storage medium 604 and 704 as in FIGS. 6-7.

At operation 502, the computing device determines the number of hosts within the enterprise which are resolving the particular domain. Operation 502 may be similar in functionality to operations 302 and 402 as in FIGS. 3-4.

At operation 504, the computing device determines the number of resolutions corresponding to the particular domain. The number of resolutions are tracked by the computing device as being the number of DNS packet(s) which resolve the particular domain over the period of time. For example, the resolutions are the number of DNS packet(s) which are transmitted as queries to the DNS server for the corresponding IP address. The computing device tracks the aggregate number of resolutions over the period of time to determine if the number is above the threshold as at operation 506.

At operation 506, the computing device determines if the numbers or values determined at operations 502-504 are above the thresholds. The computing device may proceed to operation 510, if the numbers each fall above the respective threshold. If either of the numbers fall below either threshold, the computing device may proceed to operation 508.

At operation 508, upon determining that either the number of hosts or the number of resolutions are below the threshold, the computing device identifies the particular domain as not benign. In this implementation, the computing device may proceed to log the particular domain and/or incorporate the particular domain into a blacklist. Operation 508 may be similar in functionality to operation 306 as in FIG. 3.

At operation 510, if the computing device determines that both the number of hosts and the number of resolutions are above the threshold, the computing device identifies the domain as benign. In one implementation, the computing device may proceed to operations 512-514 to discard the DNS log associated with the domain and incorporate the particular domain into the whitelist. Operation 510 may be similar in functionality to operation 308 as in FIG. 3.

At operation 512, the computing device proceeds to discard the DNS log associated with the particular domain. The DNS log may include information related to the given domain such as detailed queries, response records related to the queries, etc. This is information that may be stored prior to the identification of the particular domain as benign. By discarding the DNS log, a significant amount of storage and other associated resources are saved, thus allowing the resources to focus on the more problematic domains.

At operation 514, the computing device proceeds to incorporate the particular domain into the whitelist with other benign domains. The whitelist includes a list of domains for the enterprise which are considered safe of benign. By incorporating the particular domain into the whitelist, the computing device is able to generate enterprise-specific domains in real time.

Figure 6:
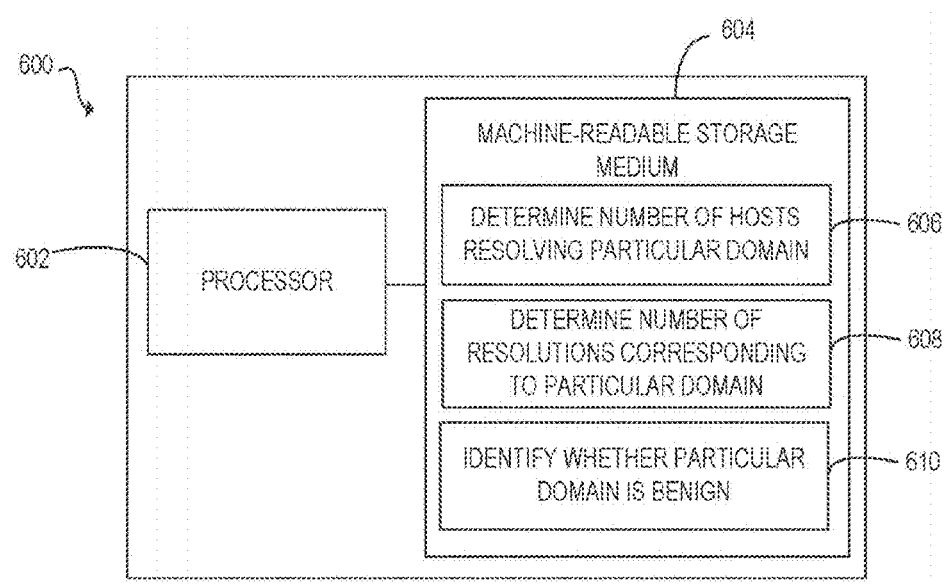
FIG. 6 is a block diagram of an example computing device with a processing resource to execute instructions in a machine-readable storage medium for identify whether a particular domain is benign based on a number of hosts and a number of resolutions.

FIG. 6 is a block diagram of computing device 600 with a processing resource 602 to execute instructions 606-610 within a machine-readable storage medium 604. Specifically, the computing device 600 with the processing resource 602 is to identify whether a particular domain is benign based on both a number of hosts resolving the particular domain and a number of resolutions corresponding to the particular domain. Although the computing device 600 includes processing resource 602 and machine-readable storage medium 604, it may also include other components that would be suitable to one skilled in the art. For example, the computing device 600 may include the appliance 104 as in FIG. 1. The computing device 600 is an electronic device with the processing resource 602 capable of executing instructions 606-610 and as such embodiments of the computing device 600 include an appliance, networking device, server, switch, mobile device, desktop computer, laptop, tablet, or other type of electronic device capable of executing instructions 606-610. The instructions 606-610 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-610 to identify whether the particular domain is benign. Specifically, the processing resource 602 executes instructions 606-610 to: determine the number of hosts resolving the particular domain; determine the number of resolutions corresponding to the particular domain; and identify whether the domain is benign based on both the number of hosts and the number of resolutions.

The machine-readable storage medium 604 includes instructions 606-610 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Figure 7:
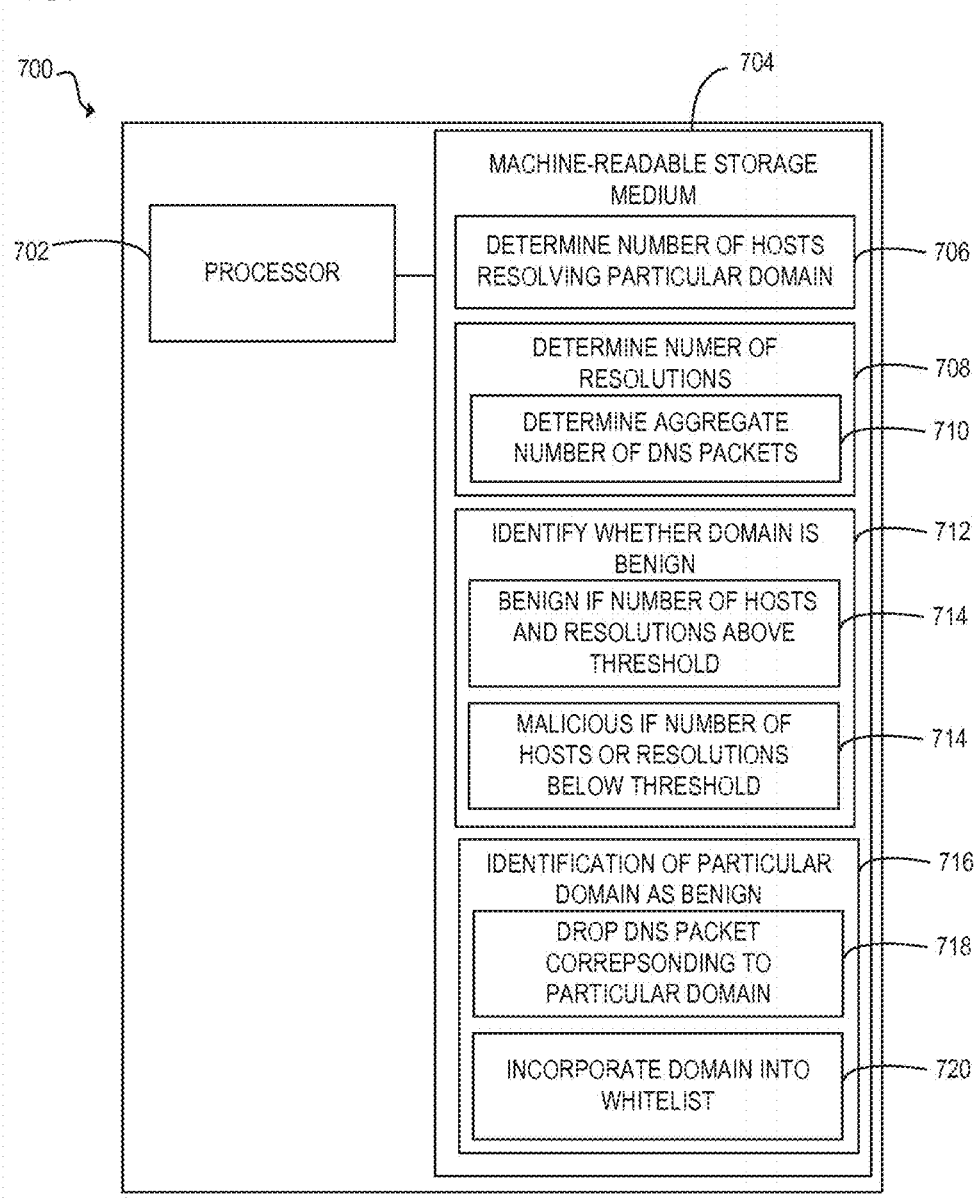
FIG. 7 is a block diagram of an example computing device with a processing resource to execute instructions in a machine-readable storage medium for identifying whether a particular domain is benign and incorporating the particular domain into a whitelist.

FIG. 7 is a block diagram of a computing device 700 with a processing resource 702 to execute instructions 706-720 within a machine-readable storage medium 704. Specifically, the computing device 700 with the processing resource 702 is to identify whether a particular domain is benign based on a number of hosts resolving the particular domain and a number of resolutions corresponding to the particular domain. Determining whether the domain is benign, the computing device may proceed to incorporate the particular domain into a whitelist. Although the computing device 700 includes the processing resource 702 and the machine-readable storage medium 704, it may also include other components that would be suitable to one skilled in the art. For example, the computing device 700 may include the appliance 104 as in FIG. 1. The computing device 700 is an electronic device with the processing resource 702 capable of executing instructions 706-720 and as such embodiments of the computing device 700 include an appliance, networking device, server, switch, mobile device, desktop computer, laptop, tablet, or other type of electronic device capable of executing instructions 706-720. The instructions 706-720 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processing resource 702 may fetch, decode, and execute instructions 706-720 to identify whether the domain is benign. Specifically, the processing resource 702 executes instructions 706-720 to: determine the number of hosts resolving the particular domain; determine a number of resolutions by determining an aggregate number of DNS packets corresponding to the particular domain; identify whether the particular domain is benign; identifying the domain as benign if the number of hosts and the number of resolutions are above a threshold; identifying the domain as malicious either the number of hosts or the number of resolutions are below the threshold; upon the identification of the particular domain as benign, discard the DNS traffic log corresponding to the particular domain; and incorporate the particular domain into the whitelist.

The machine-readable storage medium 704 includes instructions 706-720 for the processing resource 702 to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processing resource 702 to fetch, decode, and/or execute instructions of the machine-readable storage medium 704. The application and/or firmware may be stored on the machine-readable storage medium 704 and/or stored on another location of the computing device 700.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by a computing device, the method comprising:
   determining a number of hosts, within an enterprise, resolving a particular domain; and
   identifying whether the particular domain is benign based on the number of hosts resolving the particular domain, wherein identifying whether the particular domain is benign based the number of hosts resolving the particular domain comprises:
   identifying the domain as benign if the number of hosts resolving the particular domain is above a threshold; and
   identifying the domain as malicious if the number of hosts resolving the particular domain is below the threshold.

2. The method of claim 1 wherein identifying whether the particular domain is benign based on the number of hosts resolving the particular domain comprises:
   determining a number of resolutions corresponding to the particular domain; and
   in response to the identified number of hosts and the identified number of resolutions, identifying whether the particular domain is benign.

3. The method of claim 2 wherein a higher number of resolutions indicates that the particular domain is benign.

4. The method of claim 2 wherein determining the number of resolutions corresponding to the particular domain comprises:
   determining an aggregate number of domain name system (DNS) packets resolving the particular domain over a period of time.

5. The method of claim 1 comprising:
   discarding a domain name system (DNS) log associated with the particular domain in response to the identification of the particular domain as benign.

6. The method of claim 1 comprising:
   in response to the identification the particular domain as benign, incorporating the particular domain name into a whitelist.

7. A non-transitory machine-readable storage medium comprising instructions that when executed by a processing resource cause a computing device to:
   determine a number of hosts resolving a particular domain;
   determine a number of resolutions corresponding to the particular domain; and
   identify whether the particular domain is benign based on the number of hosts and the number of resolutions, wherein to identify whether the particular domain is benign based on the number of hosts and the number of resolutions comprises instructions that when executed by the processing resource causes the computing device to:
   identify the particular domain as benign if the number of hosts and the number of resolutions are each above a threshold; and
   identify the domain as malicious if the number of hosts or the number of resolutions are below the threshold.

8. The non-transitory machine-readable medium of claim 7 wherein to determine the number of resolutions corresponding to the particular domain comprises instructions that when executed by the processing resource causes the computing device to:
   determine an aggregate number of domain name system (DNS) packets resolving the particular domain over a period of time.

9. The non-transitory machine-readable storage medium of claim 7 comprising instructions that when executed by the processing resource cause the computing device to:
   discard DNS traffic log in response to the identification the particular domain is benign; and incorporate the particular domain into a whitelist.

10. The non-transitory machine-readable medium of claim 7, wherein a higher number of hosts and a higher number of resolutions indicates the particular domain is benign.

11. The non-transitory machine-readable storage medium of claim 7 comprising instructions that when executed by the processing resource cause the computing device to:

in response to the identification the particular domain as benign, incorporating the particular domain name into a whitelist.

12. A networking system comprising: an appliance to:

process domain name system (DNS) traffic between a DNS server and hosts;

determine a number of hosts, within an enterprise, resolving a particular domain;

determine a number of resolutions corresponding to the particular domain; and identify whether the particular domain is benign based on the number of hosts and the number of resolutions, wherein to identify whether the particular domain is benign, the appliance is to:

identify the particular domain as benign if the number of hosts and the number of resolutions are above a threshold; and identify the particular domain as malicious if the number of hosts or the number of resolutions are below the threshold.

13. The system of claim 12 further comprising:

a domain name system (DNS) server to exchange DNS traffic with the number of hosts.

14. The system of claim 12, wherein a higher number of hosts and a higher number of resolutions indicates the particular domain is benign.

15. The system of claim 12, the appliance to:

discard a domain name system (DNS) log associated with the particular domain in response to the identification of the particular domain as benign.

16. The system of claim 12, the appliance to:

in response to the identification the particular domain as benign, incorporate the particular domain name into a whitelist.

* * * * *